United States Patent
Wang

(10) Patent No.: US 9,242,609 B2
(45) Date of Patent: Jan. 26, 2016

(54) FOLDABLE BICYCLE CARRY RACK

(71) Applicant: KING RACK INDUSTRIAL CO., LTD., Taichung (TW)

(72) Inventor: Chiu-Kuei Wang, Taichung (TW)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 14/229,922

(22) Filed: Mar. 30, 2014

(65) Prior Publication Data

US 2014/0291373 A1    Oct. 2, 2014

(30) Foreign Application Priority Data

Mar. 28, 2013   (TW) .............................. 102205702 U

(51) Int. Cl.
    *B60R 9/10*          (2006.01)
    *B60R 9/06*          (2006.01)

(52) U.S. Cl.
    CPC ... *B60R 9/10* (2013.01); *B60R 9/06* (2013.01); *Y10S 224/924* (2013.01)

(58) Field of Classification Search
    CPC .......... B60R 9/10; B60R 9/06; Y10S 224/924
    USPC ................................. 224/924, 519–521, 549
    See application file for complete search history.

(56) References Cited

U.S. PATENT DOCUMENTS

| | | | | |
|---|---|---|---|---|
| 4,640,658 | A * | 2/1987 | Webb, Jr. ....................... | 414/462 |
| 5,190,195 | A * | 3/1993 | Fullhart et al. ................ | 224/497 |
| 5,372,287 | A * | 12/1994 | Deguevara .................... | 224/510 |
| 5,511,444 | A * | 4/1996 | Clausen et al. ............... | 74/551.2 |
| 6,000,593 | A * | 12/1999 | Chimenti ...................... | 224/504 |
| 6,644,525 | B1 * | 11/2003 | Allen et al. ................... | 224/497 |
| 2006/0273126 | A1 * | 12/2006 | Pedrini ......................... | 224/536 |
| 2007/0145088 | A1 * | 6/2007 | Depot ........................... | 224/519 |
| 2010/0096424 | A1 * | 4/2010 | Kuschmeader et al. ...... | 224/509 |
| 2010/0230455 | A1 * | 9/2010 | Wang ............................ | 224/533 |
| 2011/0049208 | A1 * | 3/2011 | Wang ............................ | 224/520 |
| 2011/0068140 | A1 * | 3/2011 | Stevens et al. ................ | 224/533 |
| 2011/0139844 | A1 * | 6/2011 | Sautter et al. ................. | 224/488 |
| 2013/0240586 | A1 * | 9/2013 | Liu ............................... | 224/485 |

* cited by examiner

*Primary Examiner* — Justin Larson
*Assistant Examiner* — Scott McNurlen

(57) ABSTRACT

A foldable bicycle carry rack includes a frame, a support member, a connection member and two plates. The support member is connected to the first end of the frame. The connection member has an installation hole to receive the first end of the frame and the two plates are connected to two sides of the connection member. Each plate has a first end protruding from the connection member and the support member is connected to the two respective first ends of the two plates. The plates and the support member are synchronically pivoted about a pivot unit which extends through the plates, the connection member and the frame. The plates and the support member are pivoted about the pivot unit until the plates and the support member are parallel to the frame to fold the bicycle carry rack.

6 Claims, 6 Drawing Sheets

FOLDABLE BICYCLE CARRY RACK

BACKGROUND OF THE INVENTION

1. Fields of the Invention

The present invention relates to a bicycle carry rack, and more particularly, to a foldable bicycle carry rack connected to the rear end of a vehicle so as to carry bicycles with the vehicle.

2. Descriptions of Related Art

The conventional bicycle carry rack is designed to be connected to the rear end or the top of a vehicle so as to carry bicycles with the vehicle such that the users can bring their bicycles to far destinations.

The conventional bicycle carry rack comprises a frame or base and a support member is horizontally connected to the frame. Clampers are connected to the support member so as to position the bicycles relative to the support member. When the bicycles are removed from the carry rack, the horizontally extending support member becomes a problem when parking because it occupies a lot of space, especially lining in the urban areas.

The present invention intends to provide a foldable bicycle carry rack wherein the support member can be foldable via simple operation steps to reduce the space required so as to improve the shortcomings mentioned above.

SUMMARY OF THE INVENTION

The present invention relates to a foldable bicycle carry rack and comprises a frame having a first end on its top end thereof and a second end on its lower end thereof. A first hole and a second hole are defined in the first end of the frame. A support member is connected to the first end of the frame so as to position bicycles. A connection member has a first portion and a second portion. The first portion has an installation hole in which the first end of the frame is inserted. The first portion has a first passage and a second passage defined therethrough. The first and second passages perpendicularly communicate with the installation hole. The first passage is located corresponding to the first hole and the second passage is located corresponding to the second hole.

Two plates are respectively connected to two sides of the connection member. Each plate has a first end protruding from the connection member and the support member is connected to the two respective first ends of the two plates. The plates and the support member are synchronically moved. A pivot unit extends through the two plates, the first passage and the first hole. The plates and the support member are synchronically pivotable about the pivot unit. An operation member removably extends through the two plates, the second passage and the second hole. The operation member is able to be secured to the plates and the frame. When the operation member is removed, the plates and the support member are pivoted about the pivot unit until the plates and the support member are parallel to the frame.

Preferably, the support member is a horizontal U-shaped member and has a closed end and two extensions extend from the closed end. Each extension has multiple clampers connected thereto. The two plates each have a through hole. Two hats are mounted to the closed end of the support member and each hat has a central hole. The closed end of the support member extends through the through holes and the central holes.

Preferably, the first portion of the connection portion has the installation hole defined in the underside thereof. The second portion has an inclined bottom. The second portion has a reception hole which has shares a common axis with the first passage.

Preferably, the two plates each are an elongate plate. A pivot hole is located next to the through hole and a fixing hole is located at a distance from the pivot hole. The pivot hole is located corresponding to the first passage and the fixing hole is located corresponding to the second passage.

Preferably, the second portion has a reception hole which shares a common axis of the first passage. The fixing hole of each of the plates is moved to be in alignment with the reception hole of the connection member when the plate is pivoted about the pivot hole.

Preferably, the operation member has a shank extending from one end thereof and a lateral rod extends radially from the operation member. A ring is fixed to the distal end of the lateral rod. The shank extends through the fixing holes of the plates, the second passage and an end hole in a cap. The end hole is a hexagonal hole and located corresponding to the second passage. The end hole has a nut located therein and the shank is threadedly connected to the nut.

Preferably, the cap has a sink hole located corresponding to the first passage and the pivot unit extends through the sink hole. The pivot unit comprises a bolt, two hollow sleeves and a nut. The cap is connected to the outside of one of the two plates. One of the sleeves is inserted into the pivot hole of one plate, the first passage of the connection member and the first hole of the frame. The other sleeve is inserted into the sink hole of the cap, the pivot hole of the other plate, the first passage and the first hole of the frame. The bolt extends through the two sleeves and enters into the cap. The nut of the pivot unit is connected to the distal end of the bolt.

The bicycle carry rack of the present invention can be folded to reduce the occupied space required. The support member and the two plates are connected to each other. The plates are cooperated to the connection member to be pivotably connected to the first end of the frame so that when applying a force to the support member, the plates are pivoted about the pivot unit to fold down the support member until the support member is parallel to the frame. Therefore, the bicycle carry rack can be folded to be easily stored and carried.

The operation of the bicycle carry rack is easy by simply removing the operation member to fold the plats and the support member.

The operation member secures the plates, the connection member and the frame so that when removing the operation member, the bicycle carry rack is folded downward. The operation member is inserted into the plates, the connection member and the frame to secure the folded status.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
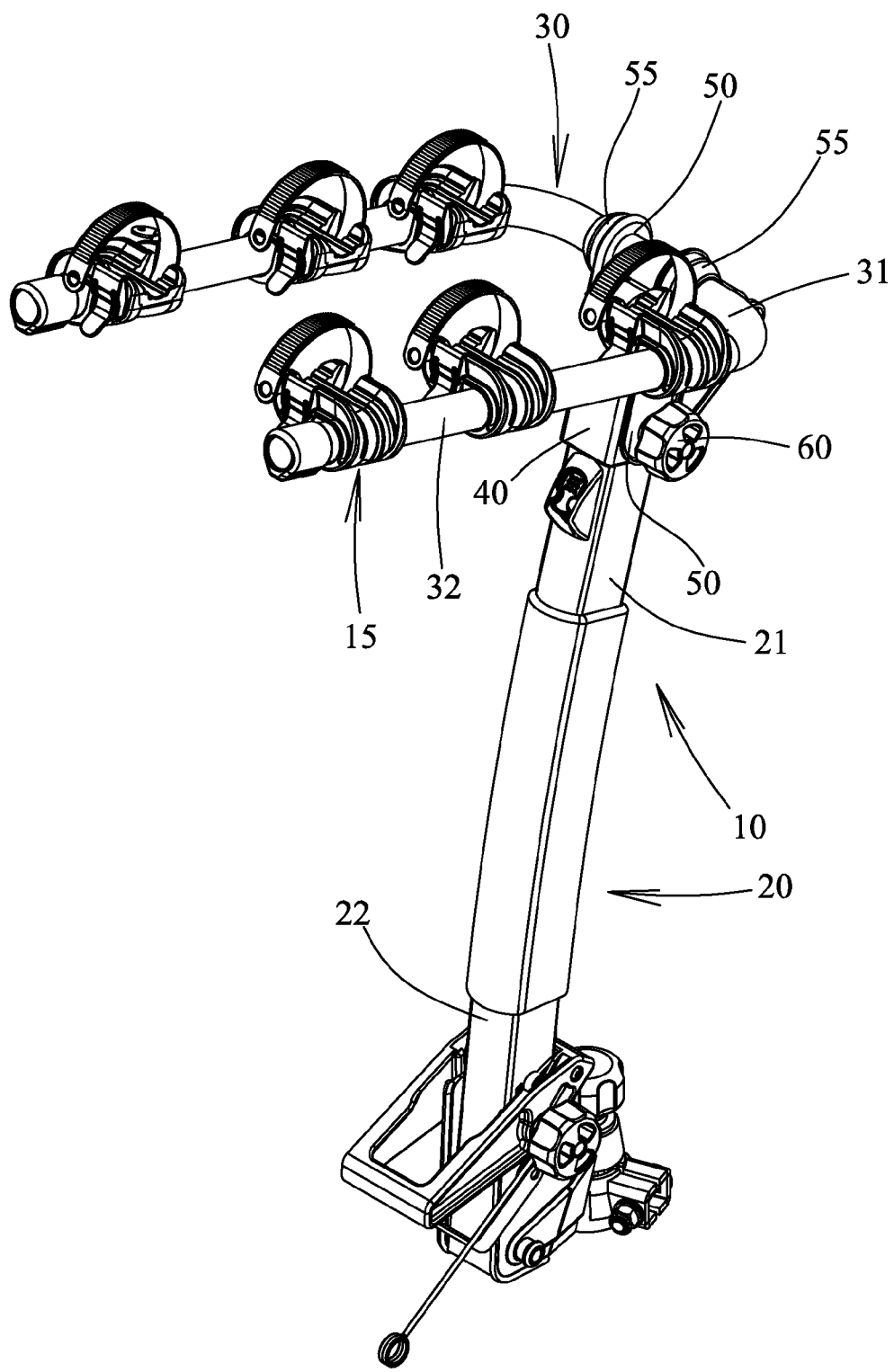
FIG. 1 is a perspective view to show the bicycle carry rack of the present invention.

Referring to FIG. 1, the foldable bicycle carry rack 10 of the present invention comprises a frame 20, a support member 30 on the top of the frame 20 and a folding mechanism is connected between the support member 30 and the frame 20.

Figure 2:
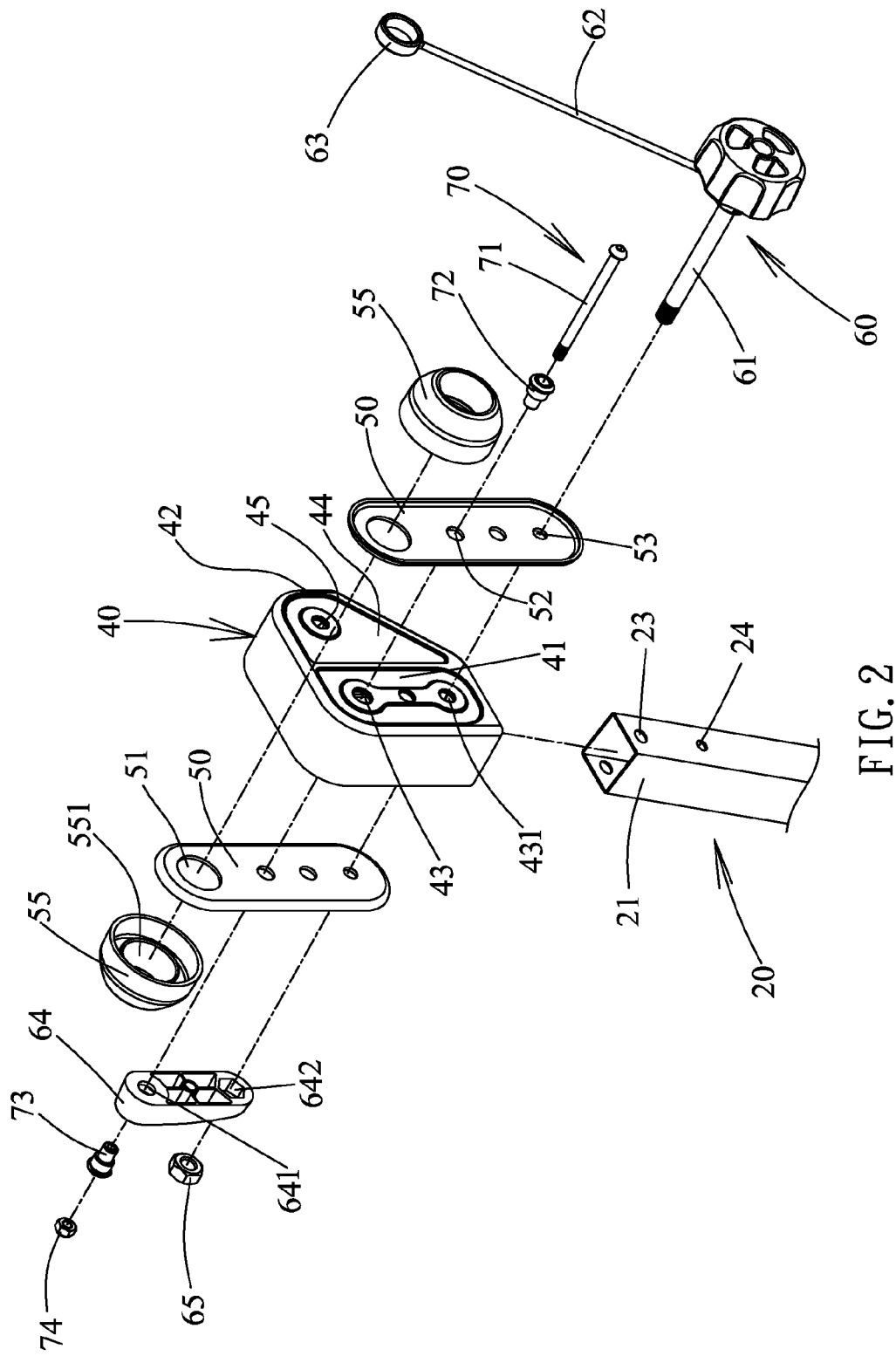
FIG. 2 is an exploded view of the folding mechanism of the bicycle carry rack of the present invention.
Figure 3:
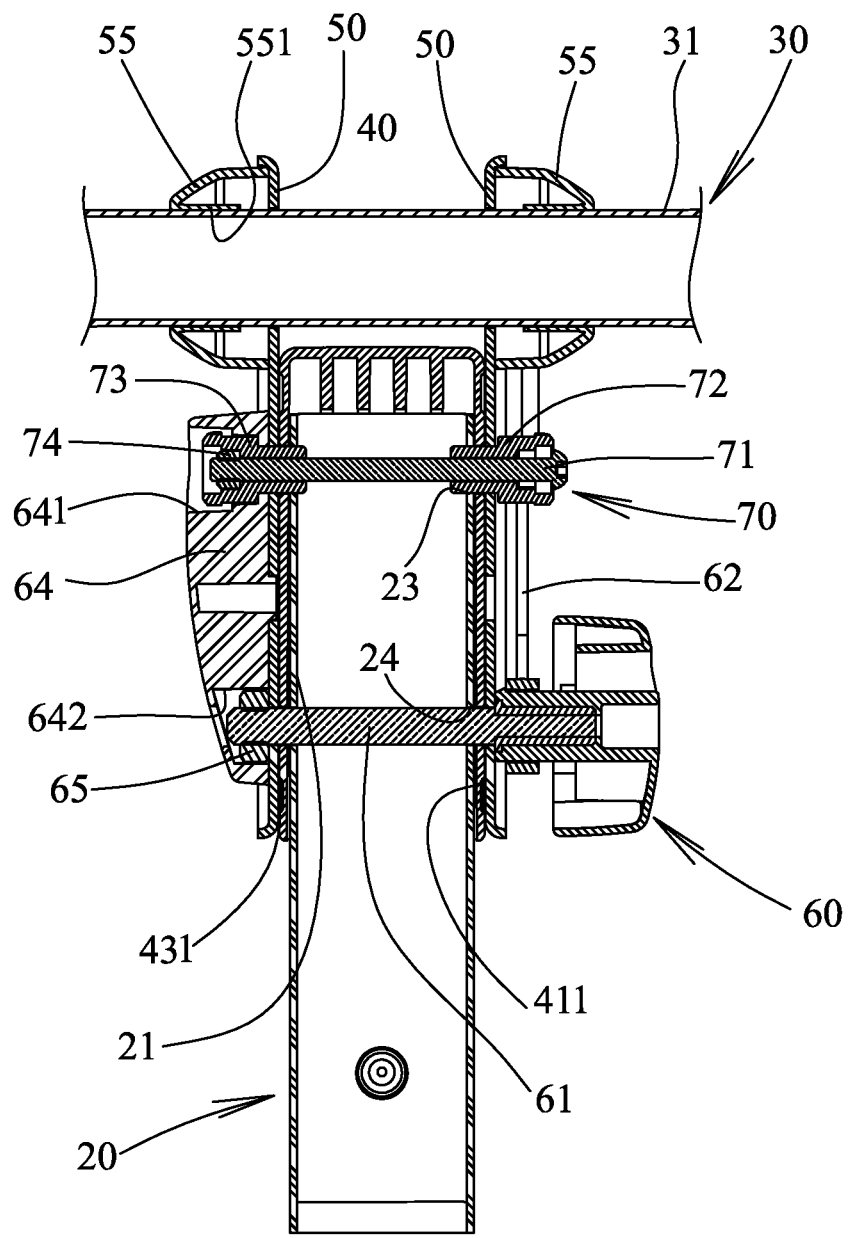
FIG. 3 is a cross sectional view to show the bicycle carry rack of the present invention.

The frame 20 has a first end 21 on the top end thereof and a second end 22 on the lower end thereof. As shown in FIGS. 2 and 3, a first hole 23 and a second hole 24 are defined in the first end 21 of the frame 20.

The support member 30 is connected to the first end 21 of the frame 20. The support member 30 is a horizontal U-shaped member and has a closed end 31 and two extensions 32 extend from the closed end 31. Each extension 32 has multiple clampers 15 connected thereto so as to clamp bicycles. The closed end 31 is connected to the folding mechanism.

Figure 5:
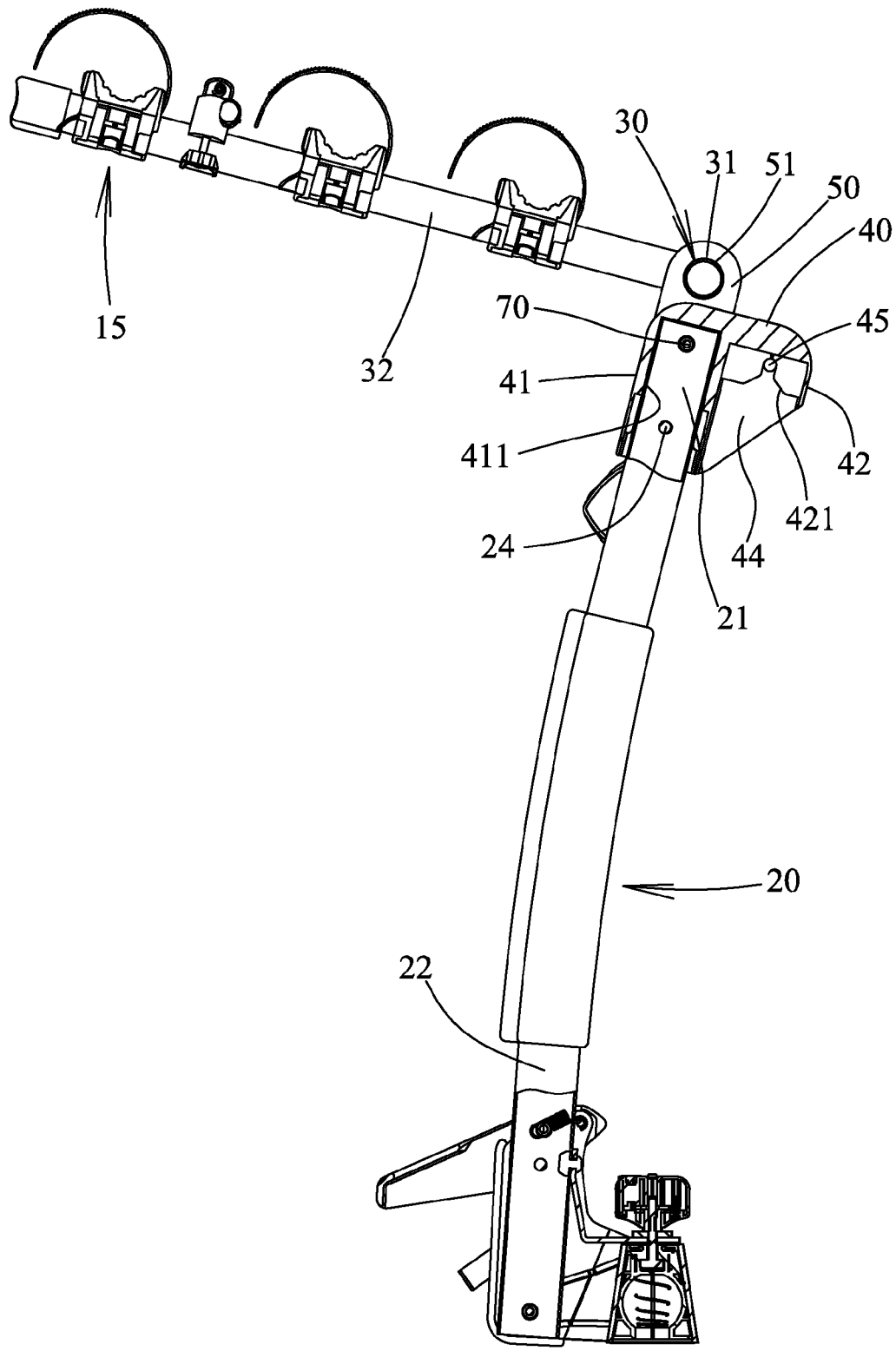
FIG. 5 is a side partial cross sectional view of the bicycle carry rack of the present invention.

A connection member 40, as shown in FIGS. 2 and 3, is connected to the first end 21 of the frame 20, and has a first portion 41 and a second portion 42. The first portion 41 has an installation hole 411 defined in the underside thereof so as to receive the first end 21 of the frame 20. The first portion 41 further has a first passage 43 and a second passage 431 defined therethrough, and the first and second passages 43, 431 perpendicularly communicate with the installation hole 411. The second portion 42 has a recess 421 defied in the underside thereof, as shown in FIG. 5, and the second portion 42 has an inclined bottom 44. The second portion 42 has a reception hole 45 which has an axis that is parallel to the axis of the first passage 43. The reception hole 45 and the first passage 43 are located on the same horizontal plane. The reception hole 45 perpendicularly communicates with the recess 421. The reception hole 45 can also be a notch. The first end 21 of the frame 20 is inserted into the installation hole 411 so that the first passage 43 is located in register with the first hole 23 and the second passage 431 is located in register with the second hole 24.

Two plates 50 are respectively connected to two sides of the connection member 40. Each of the plates 50 is an elongate plate and has a through hole 51, a pivot hole 52 and a fixing hole 53 from the top to the bottom. The through hole 51 is located above the connection member 40. The pivot hole 52 is located next to the through hole 51 and located corresponding to the first passage 43. The fixing hole 53 is located at a distance from the pivot hole 52 located corresponding to the second passage 431. The plates 50 and the support member 30 are synchronically pivotable about the pivot hole 52, and the fixing hole 53 is moved to be in alignment with the reception hole 45. The two through holes 51 of the two plates 50 are cooperated with two hats 55 and each hat 55 has a central hole 551 which is in alignment with the through hole 51. The closed end 31 of the support member 30 extends through the through holes 51 and the central holes 551 to connect the support member 30 to the plates 50 to ensure that the plates 50 and the support member 30 are pivoted synchronically.

An operation member 60 has a shank 61 extending from one end thereof and a lateral rod 62 extends radially from the operation member 60. A ring 63 is fixed to a distal end of the lateral rod 62. The shank 61 extends through the fixing holes 53 of the plates 50, the second passage 431 and an end hole 642 in the cap 64. The cap 64 is an elongate member and has a sink hole 641 and an end hole 642 respectively located corresponding to the first and second passages 43, 431. The end hole 642 is a hexagonal hole and has a nut 65 securely located therein, and the shank 61 is threadedly connected to the nut 65 so that the frame 20 and the plates 50 cannot rotate randomly. When folding the bicycle carry rack by pivoting the plates 50, the shank 61 is unscrewed from the nut 65 so that the shank 61 is pulled out from the connection member 40 and the plates 50, and the support member 30 can be rotated. The unscrewed nut 65 can be connected to the shank 61 to avoid from lost.

A pivot unit 70 comprises a bolt 71, two hollow sleeves 72, 73 and a nut 74. As shown in FIGS. 2 and 3, the cap 64 is connected to the outside of one of the two plates 50, the sleeve 72 is larger than the outer diameter of the bolt 71 and is inserted into the pivot hole 52 of one plate 50, the first passage 43 of the connection member 40 and the first hole 23 of the frame 20. The other sleeve 73 is inserted into the sink hole 641 of the cap 64, the pivot hole 52 of the other plate 50, the first passage 43 and the first hole 23 of the frame 20. The two sleeves 72, 73 respectively extend into the two plates 50 from outside thereof. The bolt 71 extends through the two sleeves 72, 73 and enters into the cap 64. The nut 74 of the pivot unit 70 is connected to the distal end of the bolt 71.

Figure 4:
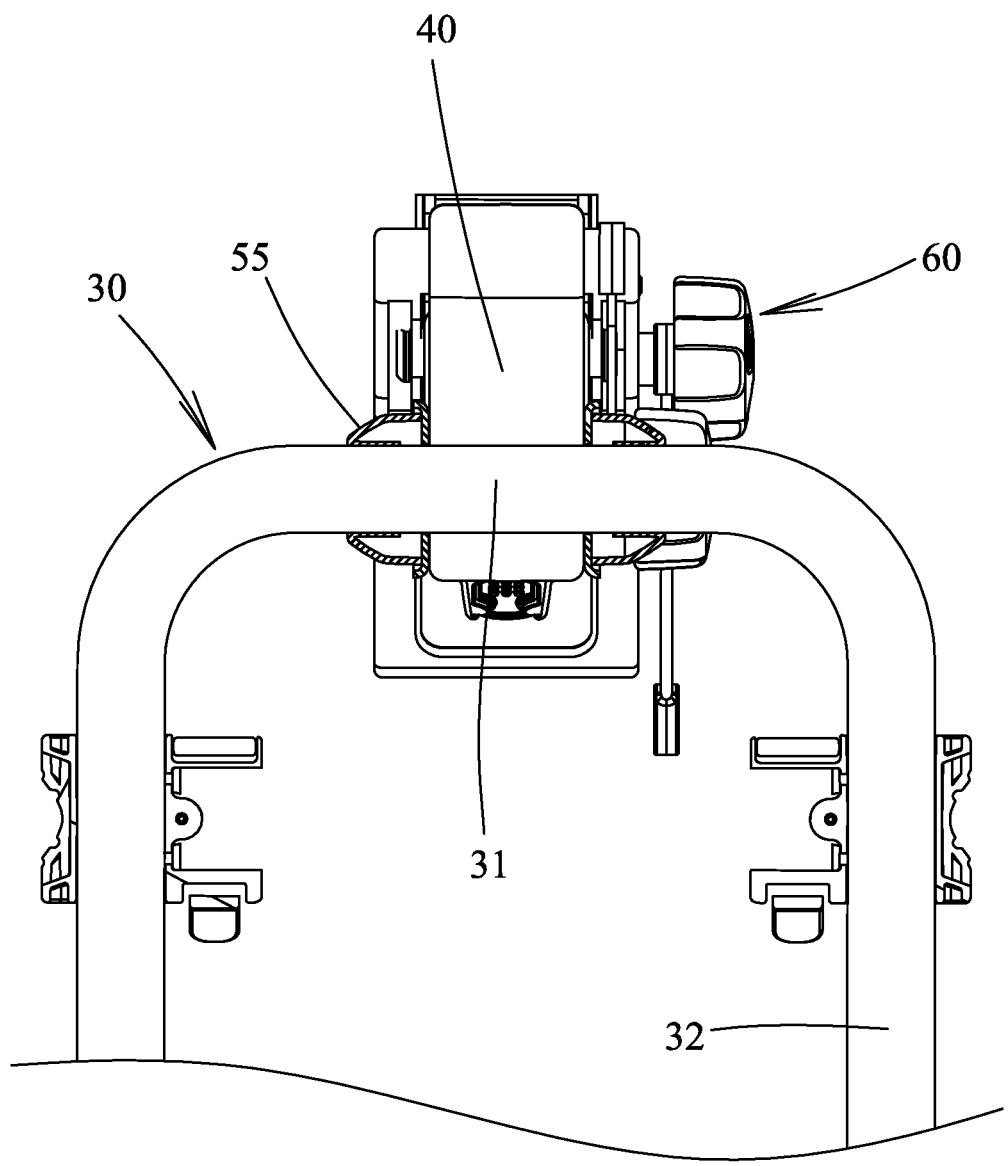
FIG. 4 is a top partial cross sectional view to show the bicycle carry rack of the present invention.

As shown in FIGS. 1, 3 and 4, when the support member 30 is horizontally positioned, the plates 50 are upright orientated and the shank 61 of the operation member 60 extends through the fixing holes 53 and the second hole 24 to fix the support member 30 to support the bicycles (not shown).

Figure 6:
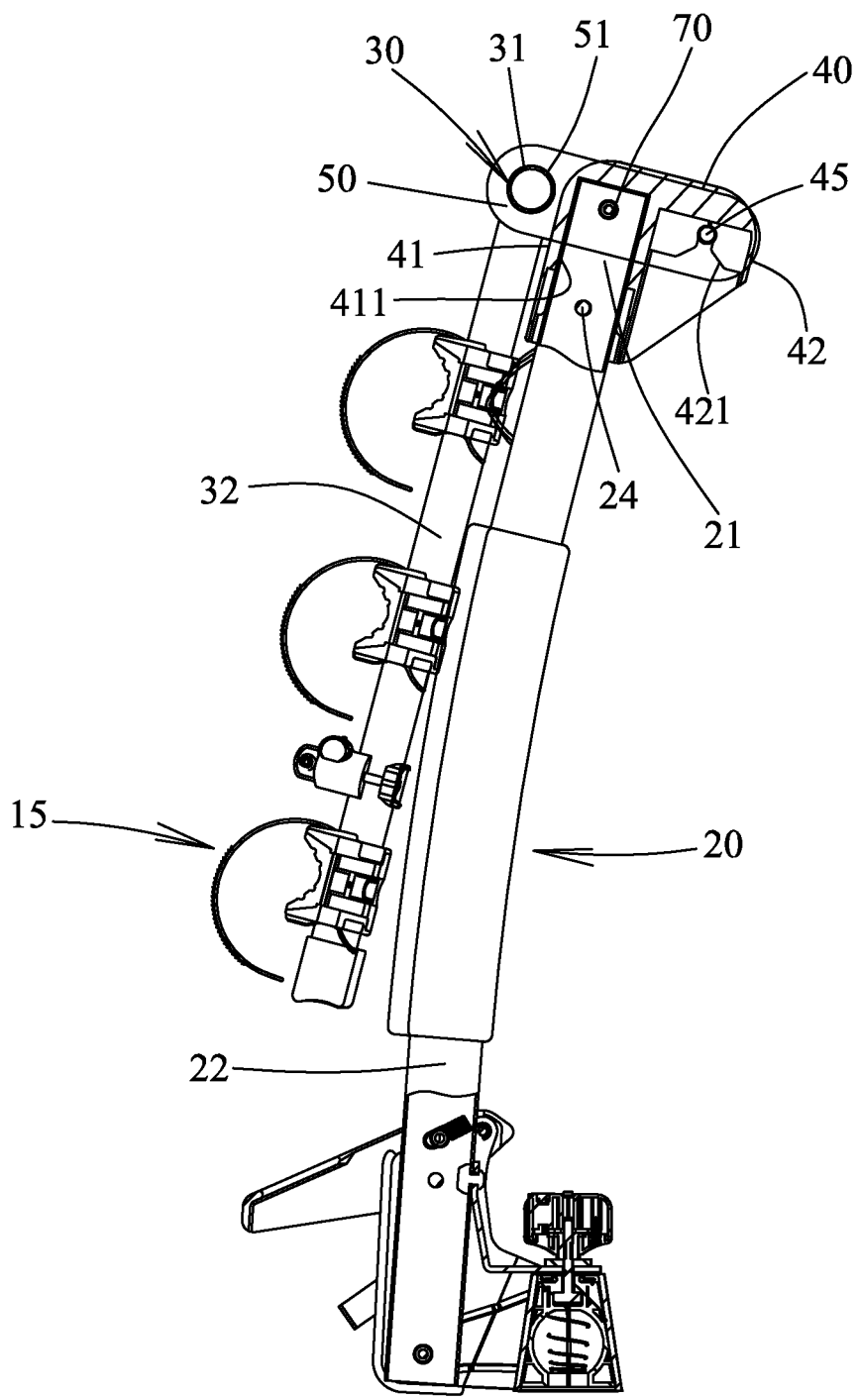
FIG. 6 is a side cross sectional view to show the folded status of the bicycle carry rack of the present invention.

As shown in FIGS. 3, 5 and 6, when folding the bicycle carry rack, the nut 65 is unscrewed to allow the user to pull the operation member 60 from the bicycle carry rack and to release the connection between the plates 50 and the frame 20. The extensions 32 are then pivoted downward so that the support member 30 and the plates 50 are pivoted downward about the pivot unit 70, the extensions 32 are pivoted toward the frame 20 until the support member 30 are parallel and contact the frame 20. Therefore, the space that the support member 30 occupies is reduced. The fixing holes 53 of the plates 50 are moved to be in alignment with the reception hole 45 of the connection member 40 when the plate 50 is pivoted about the pivot hole 52. The operation member 60 then extends through the fixing holes 53, the reception hole 45, the end hole 642, and the shank 61 is connected to the nut 65. To secure the support member 30 and the frame 20 at the folded status.

The second portion 42 has the inclined bottom 44 which reduces the overlapped area between the connection member 40 and the plates 50 so as to protect the user's fingers from being clamped in the gap between the connection member 40 and the plates 50.

When expand the bicycle carry rack 10, again, the nut 65 is unscrewed to allow the user to pull the operation member 60 from the reception hole 45 and then the plates 50 and the support member 30 are pivoted downward about the pivot unit 70, the extensions 32 are pivoted upward and the plates 50 are pivoted upright. The fixing holes 53 are in alignment with the second hole 24, the shank 61 extends through fixing holes 53, the first passage 431 and the second hole 24, and is connected with the nut 65.

While we have shown and described the embodiment in accordance with the present invention, it should be clear to those skilled in the art that further embodiments may be made without departing from the scope of the present invention.

What is claimed is:

1. A foldable bicycle carry rack comprising:

a frame having a first end on a top end thereof and a second end on a lower end thereof, a first hole and a second hole being defined in the first end of the frame;

a support member connected to the first end of the frame so as to position bicycles;

a connection member having a first portion and a second portion, the first portion having an installation hole in which the first end of the frame is inserted, the first portion having a first passage and a second passage defined therethrough, the first and second passages perpendicularly communicating with the installation hole, the first passage located corresponding to the first hole and the second passage located corresponding to the second hole, two elongate plates respectively pivotably connected to two sides of the connection member, each plate having a first end protruding from the connection member with a through hole through which the support member passes so that the support member is connected to the two respective first ends of the two plates, each plate having a pivot hole located next to the through hole and a fixing hole next to the pivot hole, the pivot hole located in register with the first passage and the fixing hole located in register with the second passage, the plates and the support member being synchronically moved, a pivot unit extending through the pivot hole of the two plates, the first passage and the first hole, the plates and the support member being synchronically pivotable about the pivot unit, an elongate cap connected to an outside of one of the two plates, the cap having a sink hole in register with the first passage and an end hole in register with the second passage, the pivot unit extending into the sink hole, a first nut disposed in the end hole, the end hole having a shape conformal to the first nut, and an operation member having a shank extending from one end thereof, the shank removably extending through the fixing holes of the two plates, the second passage and the second hole to threadedly connect to the first nut in the end hole in the cap, the operation member thereby being able to be secured to the plates and the frame, and when the operation member is removed, the plates and the support member are pivoted about the pivot unit until the plates and the support member are parallel to the frame.

2. The bicycle carry rack as claimed in claim 1, wherein the support member is a horizontal U-shaped member having a closed end and two extensions extend from the closed end, each extension has multiple clampers connected thereto, two hats are mounted to the closed end of the support member and each hat has a central hole, and the closed end of the support member extends through the through holes and the central holes.

3. The bicycle carry rack as claimed in claim 1, wherein the first portion of the connection member has the installation hole defined in an underside thereof, the second portion has an inclined bottom, and the second portion has a reception hole which has an axis parallel with an axis of the first passage.

4. The bicycle carry rack as claimed in claim 1, wherein the second portion has a reception hole which has an axis parallel to an axis of the first passage, and the fixing hole of each of the plates is moved to be in alignment with the reception hole of the connection member when the plate is pivoted about the pivot hole.

5. The bicycle carry rack as claimed in claim 1, wherein a lateral rod extends radially from the operation member, and a ring is fixed to a distal end of the lateral rod.

6. The bicycle carry rack as claimed in claim 5, wherein the pivot unit comprises a bolt, two hollow sleeves and a second nut, one of the sleeves is inserted into the pivot hole of one plate, the first passage of the connection member and the first hole of the frame, the other sleeve is inserted into the sink hole of the cap, the pivot hole of the other plate, the first passage and the first hole of the frame, the bolt extends through the two sleeves and enters into the cap, and the second nut is connected to a distal end of the bolt.

* * * * *